(12) United States Patent
Burd

(10) Patent No.: US 9,096,321 B2
(45) Date of Patent: Aug. 4, 2015

(54) COMPACT AIRCRAFT GALLEY PLUMBING SYSTEM

(71) Applicant: B/E Aerospace, Inc., Wellington, FL (US)

(72) Inventor: Peter John Leslie Burd, Carmarthenshire (GB)

(73) Assignee: B/E Aerospace, Inc., Wellington, FL (US)

( * ) Notice: Subject to any disclaimer, the term of this patent is extended or adjusted under 35 U.S.C. 154(b) by 180 days.

(21) Appl. No.: 13/862,044

(22) Filed: Apr. 12, 2013

(65) Prior Publication Data

US 2013/0269797 A1    Oct. 17, 2013

Related U.S. Application Data

(60) Provisional application No. 61/624,046, filed on Apr. 13, 2012.

(51) Int. Cl.
*B60R 15/00* (2006.01)
*B64D 11/04* (2006.01)
*B64D 11/02* (2006.01)

(52) U.S. Cl.
CPC ............... *B64D 11/04* (2013.01); *B64D 11/02* (2013.01); *Y02T 50/46* (2013.01)

(58) Field of Classification Search
CPC .......... B64D 11/02; B64D 11/04; C02F 9/005
USPC ......................... 137/899.2; 210/153, 416.3
See application file for complete search history.

(56) References Cited

U.S. PATENT DOCUMENTS

| | | | |
|---|---|---|---|
| 5,083,727 A | 1/1992 | Pompei et al. | |
| 5,261,440 A * | 11/1993 | Frank | 137/209 |
| 5,303,739 A | 4/1994 | Ellgoth et al. | |
| 5,309,938 A | 5/1994 | Ellgoth et al. | |
| 5,769,124 A | 6/1998 | Ehrhardt | |
| 7,819,362 B2 * | 10/2010 | Hale et al. | 244/136 |
| 2009/0020172 A1 | 1/2009 | Walker | |
| 2012/0217343 A1 | 8/2012 | Koschberg et al. | |

OTHER PUBLICATIONS

EPO, International Search Report and Written Opinion from International Application PCT/US2013/036471 dated Aug. 7, 2013.

* cited by examiner

*Primary Examiner* — John K Fristoe, Jr.
*Assistant Examiner* — Reinaldo Sanchez-Medina
(74) *Attorney, Agent, or Firm* — Fulwider Patton LLP

(57) ABSTRACT

An aircraft galley plumbing is disclosed comprising water distribution components and assemblies to allow installation in a wet/refrigerated reduced foot print galley. The system includes a single potable water distribution manifold with quick disconnect couplings for the GAINS and built in air bleed devices facilitate rapid drainage and easy installation. The system also includes a compact pressure check valve to control filling operation and drain down of the potable water system. The use of a compact air stop valve and integrated master distribution block (manifold) and water filter system further enhance the system.

10 Claims, 4 Drawing Sheets

COMPACT AIRCRAFT GALLEY PLUMBING SYSTEM

CROSS-REFERENCES TO RELATED APPLICATIONS

This application claims priority from U.S. application No. 61/624,046, filed Apr. 13, 2012, incorporated fully herein by reference in its entirety.

BACKGROUND

One important system on a commercial aircraft is the plumbing system. Both potable and waste water must be stored, introduced, circulated, and collected on the aircraft via the plumbing system. On a commercial aircraft, potable water is used for multiple applications, including drinking water, beverages such as coffee and tea, cooking (steam ovens, rice boilers etc.), and as a result must meet certain safety requirements. That is, to ensure that it fit for human consumption, potable water available on an aircraft has to meet certain minimum health and safety standards. This is partially accomplished with filtering, which also improves the taste and smell, and removes impurities and harmful bacteria. The aircraft plumbing system encompasses all aspects of water usage on a galley, and includes its associated hardware and components as well as the other galley equipment, either consuming or producing water.

To meet the requirements of potable water, galley plumbing systems must pass design requirements specified by the aircraft manufacturers and proving tests to ensure that the potable, waste and foul water systems remain separated and that no cross contamination can occur. Also, when the aircraft shuts down after completion of a flight, or for longer periods of storage or maintenance, all of the systems must be capable of draining completely to evacuate all residual water within a specified time, without retaining any water that could potentially become contaminated or breed bacteria. To this end, the plumbing system must be capable of ambient pressure evacuation, i.e., receiving air into the system to cause rapid displacement and removal of any trapped water.

It is common practice in the airlines for potable water that has passed through the water filter of the plumbing system to be regarded as waste water. However, recent changes in policy by aircraft manufacturers that are driven by the need to conserve water, has led to requirements that potable water only becomes waste water when it has entered the galley sink (or foul water through the GWDU). In view of this, it is possible to reclaim potable water by draining all other water fed devices including water boilers, faucets, ovens, filters, etc. into the fresh water tanks. In addition, at the resumption of service, the potable water supply circuit must be capable of being filled automatically without manual assistance, and all sections that may potentially trap air must be capable of self venting. When filling the potable water circuit, it is important to remember that pressures vary depending on the aircraft and design.

As new requirements and regulations become pertinent to the aircraft plumbing systems, it is necessary for aircraft galley plumbing systems to adapt and become more efficient and effective. The present invention addresses these issues.

SUMMARY OF THE INVENTION

The present invention is an improved aircraft galley plumbing system that provides for the installation of a full potable/waste/vacuum plumbing system having a reduced footprint and a wet/refrigerated galley by virtue of the use of special control valves and the strategic location of components. The system can be fully integrated into the structure, either on a detachable service wall or behind it. The present invention uses a high proportion of non-metallic modular components to significantly reduce cost and weight, and offers simplified re-configurability for galley inserts ("GAINs"). The system further provides for multiple potable water supply and drainage options.

Other features and advantages of the present invention will become more apparent from the following detailed description of the preferred embodiments in conjunction with the accompanying drawings, which illustrate, by way of example, the operation of the invention.

DETAILED DESCRIPTION OF THE PREFERRED EMBODIMENTS

Figure 1:
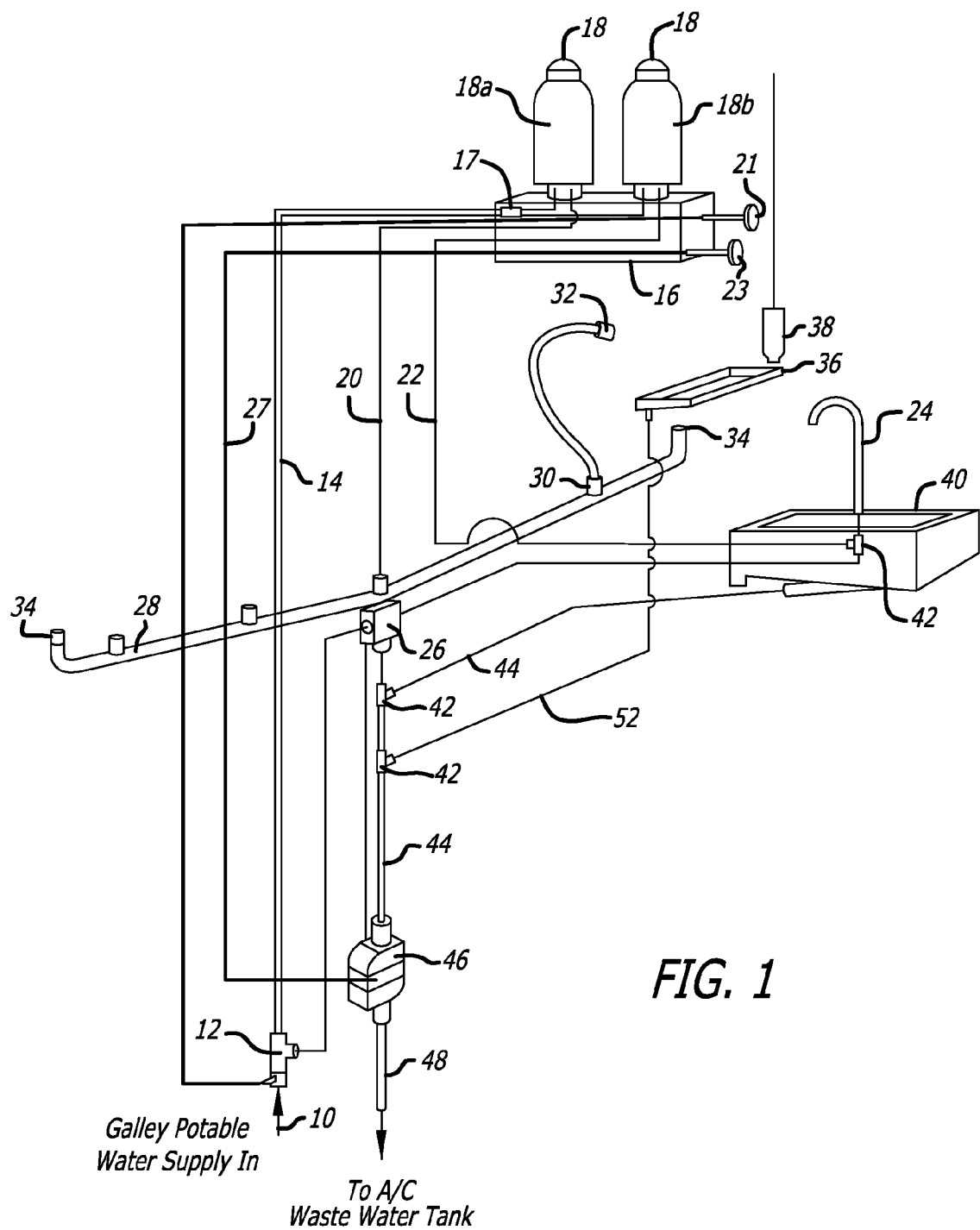
FIG. 1 is a perspective view of an aircraft galley plumbing system according to the present invention.

The plumbing system as shown in FIG. 1 illustrates a schematic for a compact integrated plumbing system designed for use in a reduced foot print refrigerated/wet galley. Water is provided via a bottom fed potable water delivery system where the water supply originates from the bottom of the monument. Potable water (indicated by arrow 10) enters the plumbing system via a "T" valve 12 incorporating a remotely operated shut off valve. The main feed supplies 14 the water distribution/filter block 16 through a two way valve 17, where it is filtered using a selected filtration method such as, for example, a spin on type water purification cartridges that incorporate self-venting units 18. Preferably two or more filters 18 are used to reduce back pressure in the system and to allow airlines to select different levels of filtration, a GAINS supply line water filter 18a and a faucet supply line water filter 18b. One line 20 connected to the filter 18a supplies the galley insert equipment (GAINS) such as coffee makers, steam ovens, etc., and the other line 22 from the filter 18b supplies the fresh water faucet 24. The distribution block 16 includes a remote emergency potable water shut off valve 21 and a backflow prevention valve manual override 23 controlled by a cable 27.

The second branch of the Tee valve 12 supplies pressurized water to the compact pressure check valve 26 at a pre-defined pressure. This check valve 26 closes the valve 12 preventing drain down from the GAIN water distribution manifold 28. The distribution manifold 28 supplies potable water via quick disconnect fittings 30. The GAINS are connected to the manifold 28 by flexible hoses 32. The manifold 28 also preferably incorporates self-venting devices 34 to aid the (potable water) filling process, as does the faucet 24. Water from the faucet 24, from GAIN drip trays 36 via condensate drainage catch pots 38, and any condensate from galley air chiller units, is disposed of via drain line 52 to waste line 44 via Tee piece 42.

Drainage of waste water entering the sink is accomplished via a Tee piece 42 in the waste water drain line 44 and through a compact backflow prevention device or Air Stop Valve 46, which operates under a partial vacuum. A manual over ride is remotely connected to the distribution filter block 16. Both the potable drain line 52 and waste water line 44 drain down into the aircraft waste water tank via line 48.

In the foregoing plumbing system, all of the waste water drains downward to the aircraft waste water tank. Filtered water is distributed from the filter 18a to the GAINS manifold 28 and then to the GAINS via flex hose connections 32. The system is self-venting through various self-venting devices 34, the water filters 18 and faucet 24. All standing water can be quickly vented to prevent contamination of the system and comply with regulation for potable water systems.

Figure 2:
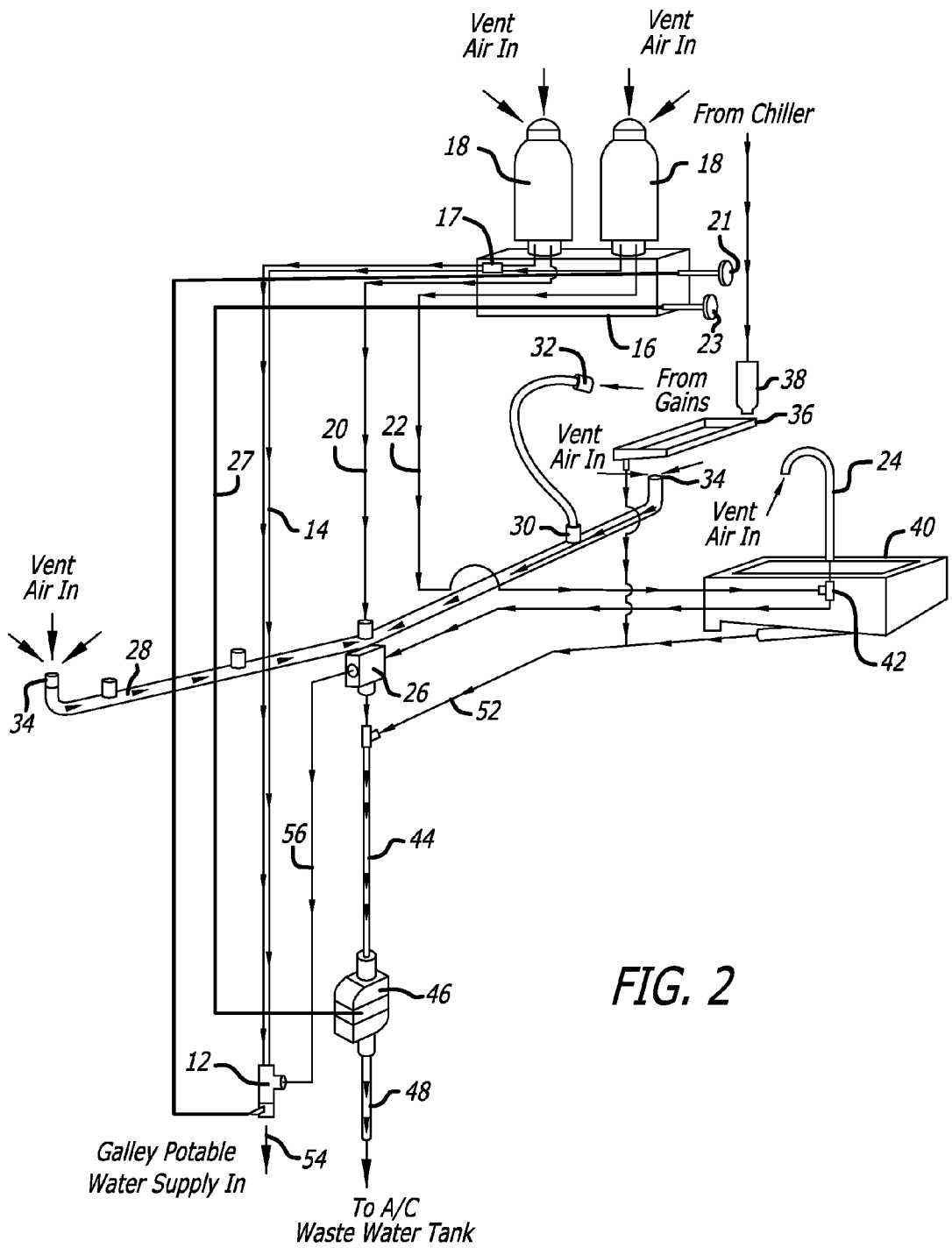
FIG. 2 is a perspective view of the aircraft galley plumbing system of FIG. 1 showing the venting and drain down operation.

FIG. 2 illustrates the plumbing system of FIG. 1 showing the evacuation operation. Waste water from the GAIN drop tray 36 and the work deck surface mounted sink 40, drain into the water drainage line 52 and to the air stop valve 46. The post-flight complete drain operation is effected through both potable supply and waste water lines. The potable water that has not entered the filters 18a,b and the pressure check valve pressure line drain directly back into the aircraft's potable water tank via line 54. Conversely, the filters 18a,b and all potable water supply lines after the filters, distribution manifold 28, and GAINS drain into the aircraft's waste water tank via the compact air stop valve 46. All residual waste water also drains via the air stop valve to the aircraft's waste water tank. As an alternate embodiment, the system could drain all potable water (defined as water that has not entered the sink or is condensate drainage) back into the aircraft potable water tank via the pressure check valve 26 and potable water drain line 56. The water from the faucet 24, GAINs, and faucet filter 18b is returned to the potable water supply in this example. Water from the sink drain pan is directed to the waste water tank line 48 via the air stop valve 46.

Figure 3:
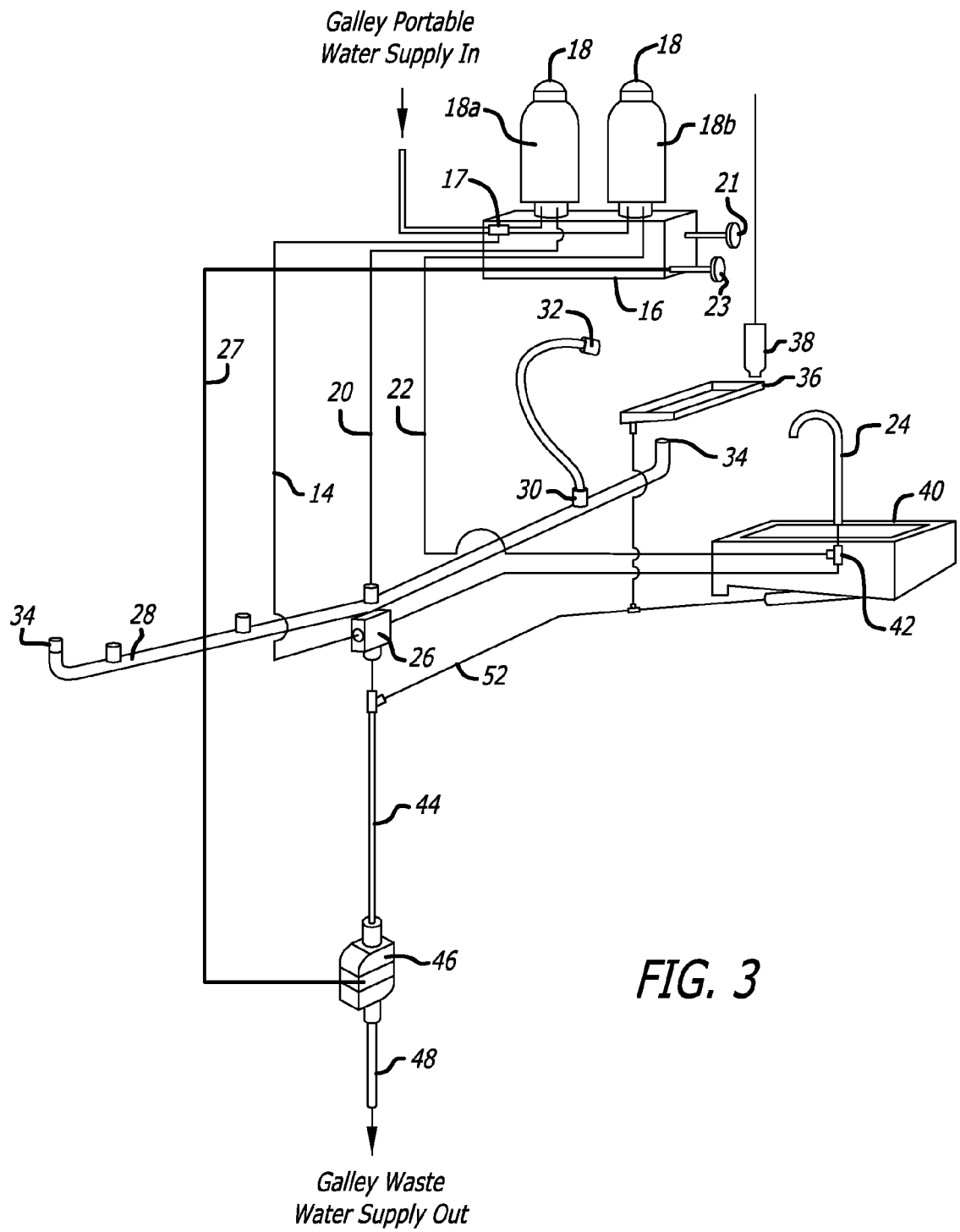
FIG. 3 is a perspective view of a second embodiment of the aircraft plumbing system with potable water supplied from above with both potable and waste water draining into a single waste tank.

FIG. 3 illustrates an alternate schematic for a compact integrated plumbing system designed to be used in reduced foot print refrigerated/wet galleys. In this case, as opposed to the previous embodiment the water supply in FIG. 3 is from the top of the monument. In this configuration, the plumbing system causes both the potable (post filtration) and waste water to drain to the aircraft waste water tank only. Principle differences between the systems of FIGS. 1 and 3 are the incorporation of the emergency shut off valve 21 into the potable water filter/distribution block 16 (feed to block will require burst protection), and simplification of the drain down system when draining to separate potable and waste water tanks. In other respects, the system is similar to that of FIG. 1. The filters, faucet, and manifold vent to the atmosphere in this configuration. This system also illustrates the potable water supply circuit operation during flight. The waste water from the GAIN filter and the sink enter the manifold and is communicated to the waste tank. The water may drain to the waste water tank only, whereas water from the drip tray and sink enter the combined water drainage line and passes through the air stop valve.

Figure 4:
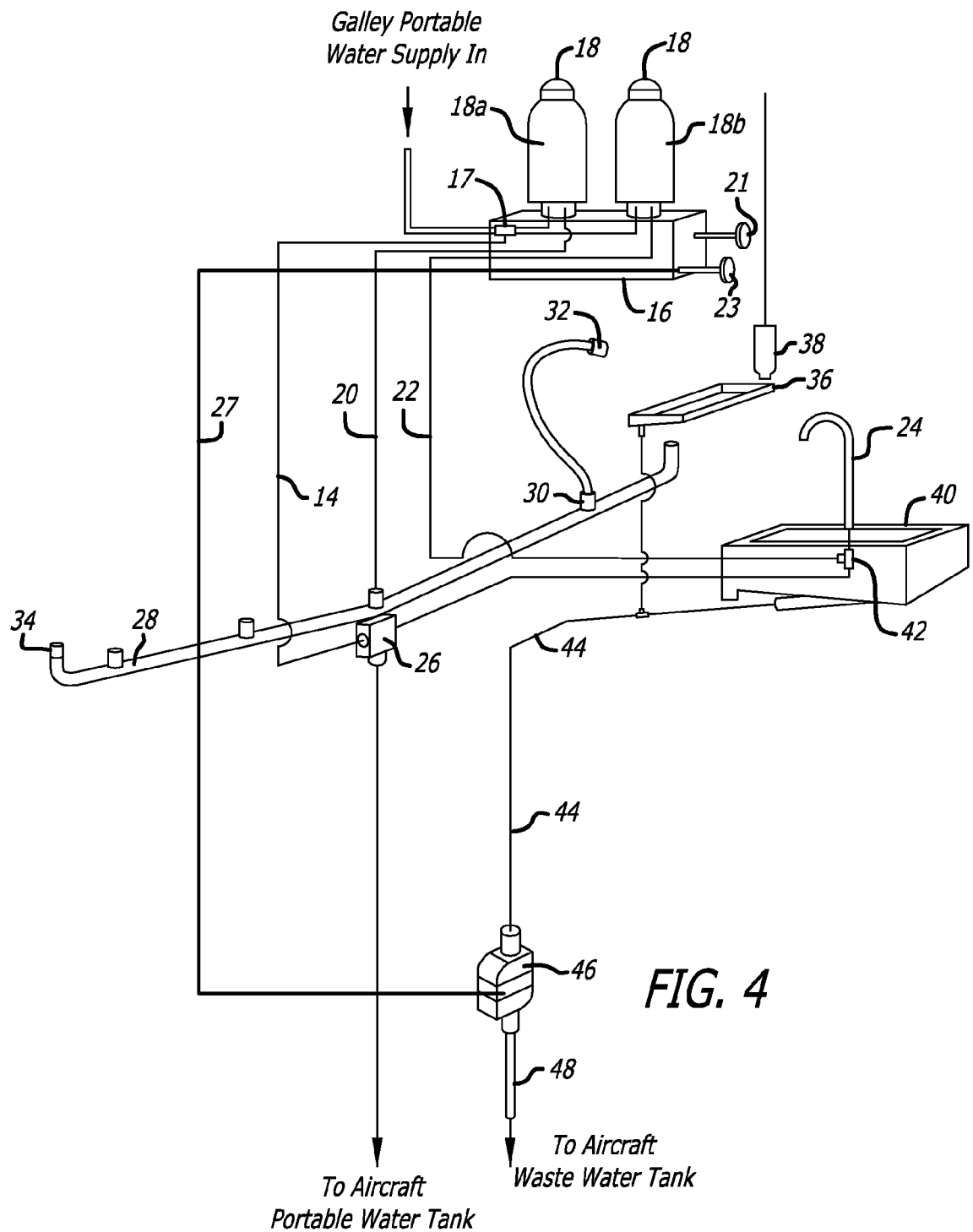
FIG. 4 is a perspective view of the embodiment of FIG. 3 showing the system drain down into separate waste and potable water tanks.

FIG. 4 illustrates the general schematic for a system drain down, where both potable supply and waste water lines, in this case all the potable water lines, filters and GAINS, drain down to the aircraft potable water tank via the pressure check valve. Further, the waste water line from the sink 44 and condensate drain down via the compact air stop valve into the aircrafts waste water tank.

The systems described above and shown in the drawings are improvements over existing systems and benefit from a simplification and standardization of the plumbing system pipe, tube and hose work water distribution components and assemblies to allow installation in a wet/refrigerated reduced foot print galley. Moreover, the use of a single potable water distribution manifold with quick disconnect couplings for the GAINS and built in air bleed devices facilitate rapid drainage and easy installation. The system also benefits from the use of a compact pressure check valve to control filling operation and drain down of the potable water system, to allow installation in a wet/refrigerated reduced foot print galley. The use of a compact air stop valve and integrated master distribution block (manifold) and water filter system further enhance the system and provide benefits that are not seen in the present galley plumbing systems.

Filtration is readily accomplished with the use of self-sealing spin on water filter cartridges with built in air bleed devices. In addition, the ability to accommodate both a top fed potable water supply and bottom fed potable water supply (from the aircraft) using the same components adds utility and versatility to the system of the present invention.

An aircraft employing the system of the present invention can achieve a full plumbing system installed in a reduced footprint (e.g., 35" deep) wet/refrigerated galley by virtue of the use of dedicated control valve designs. The system's use non-metallic materials for the majority of the components reduces weight and cost, both pivotal concerns of airlines. Moreover, the present invention advantageously uses component modularity to allow various sizes of system to be installed in different galleys with a minimum number of parts. Quick disconnect components allow the rapid removal of GAINS, and facilitates changes of the GAINS layout because of the reconfigurable manifold and quick disconnect couplings. The present invention further provides for customization of filtration requirements between GAINS and faucet if desired. The use of separate filter cartridges also reduces system pressure while allowing rapid filter cartridge replacement. Finally, the present invention provides options for draining potable and waste water into the same or separate aircraft tanks as required.

The present invention is not intended to be limited by the foregoing descriptions and figures, but rather these figures and descriptions are illustrative of the present invention. One of ordinary skill in the art would readily recognize many modifications and substitutions of known components and the present invention is intended to include all such modifications and substitutions.

I claim:

1. A plumbing system for an aircraft galley, comprising:
a potable water distribution manifold having quick disconnect couplings for associated GAINS, the potable water distribution manifold further comprising air bleed devices for facilitating rapid drainage;
a compact pressure check valve to control a filling operation and a drain down of circulating potable water;
a compact air stop valve for controlling flow through the plumbing system;
an integrated master distribution manifold coupled to a water filter system; and
a supply conduit system and a drainage conduit system for supplying and draining water, respectively.

2. The plumbing system of claim 1, wherein potable water is supplied to the plumbing system from above.

3. The plumbing system of claim 1, wherein potable water is supplied to the plumbing system from below.

4. The plumbing system of claim 1, further comprising a surface mounted sink and sink drainage line.

5. The plumbing system of claim 1, further comprising an air stop valve manual override mechanism.

6. The plumbing system of claim 1, further comprising a pair of filtration units.

7. The plumbing system of claim 6, wherein venting partially occurs when air is forced through the filtration units.

8. The plumbing system of claim 6, wherein one line from the filtration units feeds the potable water distribution manifold and a second line supplies water to a potable water faucet.

9. The plumbing system of claim 1, further comprising a remote emergency potable water shut off valve.

10. The plumbing system of claim 1, further comprising a backflow prevention valve manual override controlled by a cable.

* * * * *